June 28, 1960 H. J. PFIFFNER 2,943,282

NEGATIVE RESISTANCE NETWORKS

Filed Oct. 1, 1956

INVENTOR.
Harold J. Pfiffner,
BY
[signature]
ATTORNEY.

United States Patent Office 2,943,282

Patented June 28, 1960

2,943,282

NEGATIVE RESISTANCE NETWORKS

Harold J. Pfiffner, Venice, Calif., assignor to Hughes Aircraft Company, Culver City, Calif., a corporation of Delaware Filed Oct. 1, 1956, Ser. No. 614,776

14 Claims. (Cl. 333—80)

The present invention relates generally to two terminal resistance networks, and particularly to two terminal negative resistance networks.

In the past, negative resistance networks have utilized two or more signal amplifier devices as the active elements in a circuit arrangement which resulted in the network being extremely sensitive to normal parameter differences in the devices. The networks have been made adjustable to compensate for these differences by incorporating very large potentiometers into the circuit. Such large potentiometers are expensive and temperature dependent which makes the over-all network extremely sensitive to temperature changes.

Accordingly, it is an object of the present invention to provide a negative resistance network which is simple and utilizes a minimum number of components.

It is a further object of the present invention to provide a negative resistance network in which the signal amplifier devices may be replaced by devices of the same type without appreciably changing the characteristics of the network.

It is a still further object of the present invention to provide a negative resistance network which is insensitive to temperature changes over a large temperature range.

In accordance with this invention, a negative resistance network which is effective between two input terminals is provided in which a first and a second variable and controllable impedance device are utilized as the active elements. The first device is connected in series with a third impedance element across the input terminals. The second impedance device is coupled to the input terminals for controlling the current flow through the second impedance device directly with the amplitude of the signal that is impressed between the input terminals. A fourth impedance device is connected between the second impedance device and the junction of the first and third impedance devices to control the effective impedance of the first device directly with the current flow through the second device or directly with the amplitude of the signal impressed between the input terminals.

The novel features which are believed to be characteristic of the invention both as to its organization and method of operation, together with the further objects and advantages thereof, will be better understood from the following description considered in connection with the accompanying drawing in which.

Figures 1, 2:
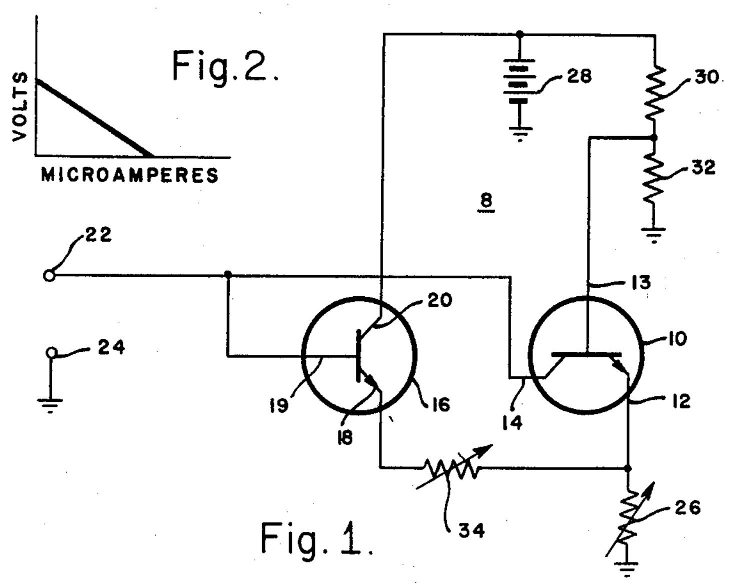
Figure 1 is a schematic circuit diagram of a two terminal network employing two semiconductor devices and embodying the principles of the present invention for providing a series negative resistance.
Fig. 2 is a graph showing the negative resistance characteristics of the network shown in Fig. 1 in which the ordinate represents voltage and the abscissa represents current.

Referring now to the drawing wherein like elements are designated by the same reference characters throughout the figures, and particularly to Fig. 1, there is shown a negative resistance network 8 which includes two signal amplifier devices 10 and 16 connected between the input terminals 22 and 24, one of which terminals is connected to a point of fixed reference potential or to signal ground. The devices are illustrated as semiconductor devices of the NPN type; however, it is to be understood that any other type of semiconductor device could be used which exhibits the characteristics essential to the operation of the network. Where other types of semiconductor devices are utilized in the network, it will be necessary to provide appropriate bias for the devices to insure that they will operate properly.

The transistor 10 includes an emitter electrode 12, a base electrode 13 and a collector electrode 14, and the transistor 16 includes an emitter electrode 18, a base electrode 19 and a collector electrode 20. The transistor 10 is connected in series between the input terminals 22 and 24 to provide a variable and controllable impedance between the input terminals. This impedance includes the collector electrode 14, the emitter electrode 12 and a variable resistor 26. The variable resistor, or potentiometer 26, is adjusted to provide the initial current flow through the network when the input signal is at a predetermined potential. A battery 28 is coupled to the base or control electrode 13 by means of a pair of voltage divider resistors 30 and 32 to provide proper bias for the base 13 to render the transistor 10 in its conducting state. This battery is also connected to the collector 20 of the transistor 16 to properly bias the transistor 16 so that it will conduct when an appropriate signal is applied between its base or control electrode 19 and its emitter electrode 18. The emitter 18 is connected to the emitter 12 through a variable resistor 34 to control the impedance of the transistor 10 directly with the current flow through the emitter circuit of the transistor 16. The base 19 is connected to the collector 14 to vary the impedance of the transistor 16 or control the current flow through the transistor 16 directly with the amplitude of the input signal. The resistor 34 may be adjusted to vary the magnitude of the negative resistance of the network.

In operation, the transistor 10 is always conducting and the degree of conduction is controlled by the transistor 16. The current flow through the transistor 10 when the input signal is at a minimum is determined by the voltage at which the base 13 is maintained and the magnitude of the resistance of the variable resistor 26. Since the transistor 10 is in a conducting state, the voltage drop between the base 13 and the emitter 12 is very small, of the order of 1/10 of a volt or less. Hence, the emitter electrode 12 will always be maintained at a voltage approximately equal to the voltage at which the base 13 is maintained. Since the voltage at which the emitter 12 is maintained is nearly constant, the current flow through the resistor 26 is also nearly constant and consists of the emitter currents of transistors 10 and 16. When the signal input voltage increases, the voltage between the base 19 and the emitter 18 increases and causes the transistor 16 to increase its conduction. The increased current flow through the emitter of transistor 16 raises the voltage of emitter 12 slightly which decreases the voltage between the emitter 12 and the base 13 and thereby decreases the current flow from the collector 14 to the emitter 12. The base current of transistor 16 is negligible compared to the collector-emitter current of transistor 10 and hence the current flow through the network decreases as the voltage across the input terminals increases. By the same analogy, a decrease of voltage across the input terminals will cause an increase in the current flow through the network. The variable resistor or potentiometer 34 may be adjusted to vary the slope of the voltage current relationship of the network, and hence determines the value of the negative resistance of the network.

While it is understood that the circuit specifications of the negative resistance network of the present invention may vary according to the design for any particular application, the following circuit specifications for the circuit of Fig. 1 to give a negative resistance of 100,000 ohms for input voltages varying between +30 v. and +45 v. are included by way of example only.

| | |
|---|---|
| Resistor **26** | 20,000 ohms. |
| Resistor **30** | 10,000 ohms. |
| Resistor **32** | 30,000 ohms. |
| Resistor **34** | 22,000 ohms. |
| Battery **28** | +50 volts. |
| Transistor **10** and **16** | Type 904A (manufactured by the Texas Instrument Co.). |

With the particular circuit specifications set forth above, negative resistance of the network may be adjusted to 100,000 ohms with the input current varying to between 227 microamperes and 277 microamperes, and the voltage input to the network varying between +30 v. and +45 v. While the circuit specifications may be changed to provide proper operation of the network for any desired application, it is desirable that the transistor 16 possess a $$\beta=\frac{\alpha}{1-\alpha}$$

of sufficient magnitude so that any change in the emitter current of transistor 16 due to a change in $\beta$ and/or a change in the input voltage will have a negligible effect on the value of the input current. Where $\alpha$ equals the current amplification factor and $\beta$ equals the grounded-emitter current amplification factor of the transistor. Also, it is desirable that the transistor 10 be so biased that its $\alpha$ is essentially constant over the operating range of the input current.

If a lower input voltage range is desired, the bias conditions on the transistors 10 and 16 may be appropriately changed. For example, where a voltage range of 0–+15 v. is desired, the resistor 26 may be connected to a bias source of −30 v. with respect to signal ground, the base 13 may be maintained at −4 v. with respect to signal ground and the collector 20 may be connected to a bias source of +20 v. with respect to signal ground.

Figures 3, 4:
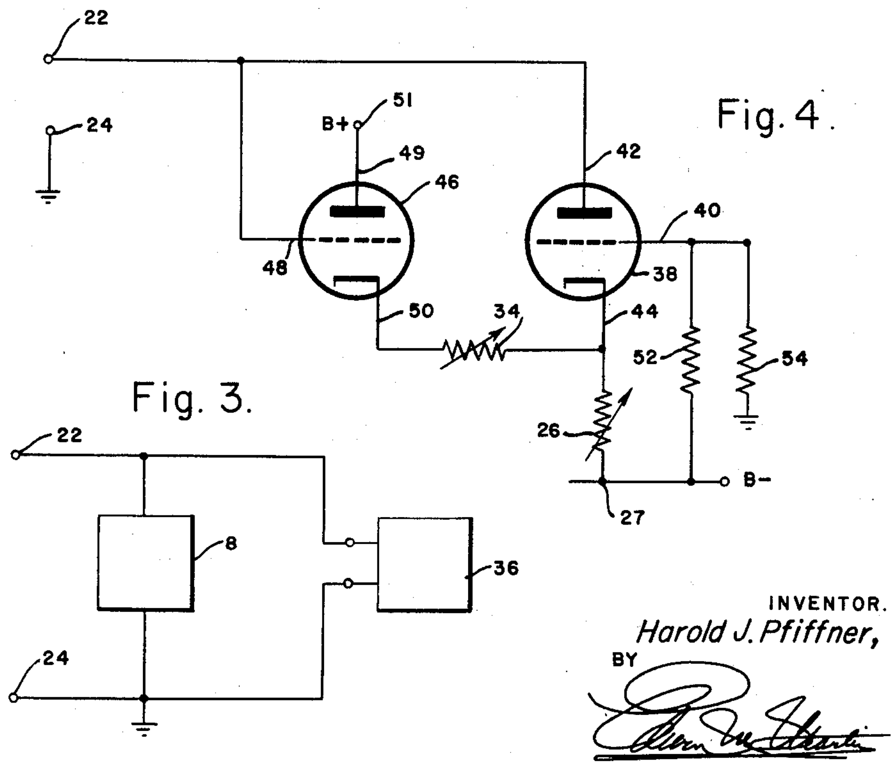
Fig. 3 is a schematic circuit diagram, in block form, illustrating one use of the series negative resistance network shown in Fig. 1.
Fig. 4 is a schematic circuit diagram of a two terminal network employing vacuum tubes and embodying the principles of the present invention for providing a series negative resistance.

Referring to Fig. 3 which illustrates one particular application for the negative resistance network shown in Fig. 1, the network 8 is connected in parallel with a sensing device 36 which has an input impedance of 100,000 ohms. The negative resistance network effectively balances the input impedance characteristic of the sensing device 36 to cause the impedance looking into the over-all system from terminals 22 and 24 to appear infinite. Hence, the negative resistance network 8 prevents the low input impedance characteristic of the sensing device from loading down the signal source that is connected to the terminals 22 and 24.

It is not necessary that semiconductor devices be used as the active elements in the series negative resistance network embodying the principles of the present invention. Such a network may utilize suitable electron discharge devices such as vacuum tubes as the active elements with proper bias and operating potentials so that the devices will operate in a manner similar to that which the transistors of Fig. 1 operate. It should be remembered that transistors are current operated devices and electron discharge devices are necessarily voltage operated devices; however, with these differences in mind, a series negative resistance network embodying the principles of the present invention can incorporate electron discharge devices as its active elements. An embodiment of a series negative resistance network in accordance with the present invention which utilizes vacuum tubes as the active elements therein is shown schematically in Fig. 4. The operation of the network shown in Fig. 4 is similar to the operation of the network shown in Fig. 1.

Referring now to Fig. 4, there is shown a series negative resistance network which includes two electron discharge devices 38 and 46. The devices are illustrated as vacuum tubes and each includes a plate electrode, a grid electrode and a cathode electrode. The vacuum tube 38 is connected in series between the input terminals 22 and 24 to operate as a variable impedance device and thereby control the current which flows into the network from an outside signal source which may be connected across the input terminals. As is shown, the plate 42 of the tube 38 is connected to terminal 22 and the cathode 44 of the tube 38 is connected in series with the variable resistor 26 to a suitable power supply which maintains the terminal 27 of resistor 26 at a negative potential with respect to signal ground. The grid 40 of tube 38 is biased by a pair of voltage divider resistors 52 and 54 and the source of biasing potential which is connected to the terminal 27 to render tube 38 in a conducting state. A suitable bias source indicated as B+ is connected to terminal 51 to render the tube 46 in a conducting state when an appropriate signal is applied between the grid 48 and the cathode 50 of tube 46. The variable resistor 34 is connected between the cathode 50 and the cathode 44. The grid 48 is connected to the plate 42 to control the flow of current through the tube 46 directly with the amplitude of the signal impressed between the plate 42 or input terminal 22 and signal ground. In operation, the tube 46 controls the voltage between the grid and cathode of tube 38 inversely with the current flow through tube 46. Hence, when the signal input between terminals 22 and 24 increases, the current flow through the tube 46 increases thereby increasing the cathode potential of the tube 38 slightly. This decreases the instantaneous signal or increases the negative bias between the grid and the cathode of tube 38 and thereby decreases the current flow through the tube 38. Since the grid current of tube 46 is negligible compared to the plate current of tube 38, the current drawn by the negative resistance network shown in Fig. 4 decreases as the voltage across terminals 22 and 24 increases and vice versa. The variable resistor 26 may be adjusted to determine the current drawn by the network when a predetermined potential is applied between terminals 22 and 24 and the variable resistor 34 may be adjusted to determine the magnitude of the negative resistance of the network.

In accordance with the present invention, a two terminal negative resistance network has been provided which utilizes a first and a second signal amplifier device as the active elements therein. Each device has a first electrode, a second electrode and a control electrode for controlling the current flow between said first and second electrodes in accordance with the amplitude of the instantaneous signal between the control electrode and the first electrode of each device. Two input terminals are provided for applying an input signal from a suitable source between the second electrode of the first device and a point of fixed reference potential. A first impedance element is connected between the first electrode of the first device and the point of fixed reference potential. A second impedance element is connected between the first electrodes of each device to control the instantaneous signal between the control electrode and the first electrode of the first device inversely with the current flow through the second device. The control electrode of the second device is connected to the second electrode of the first device to control the current flow through the second device directly with the amplitude of the instantaneous signal between the second electrode of the first device and the point of fixed reference potential thereby to cause the current flow through the first device to vary inversely with the signal impressed between the input terminals.

What is claimed is:

1. A negative resistance network comprising first and second input terminals between which the negative resistance is effective, said second terminal being connected to a point of fixed reference potential, a first variable and controllable impedance device having a load current path and a control terminal, bias means coupled to said control terminal of said first impedance device, a first resistor through which a constant current is maintained, said load current path of said first variable and controllable impedance device and said first resistor being connected in series between said input terminals and having a common junction point, a second variable and controllable impedance device having a load current path and a control terminal, said control terminal coupled directly to said first input terminal for controlling the current flow through said second variable and controllable impedance device directly with the amplitude of the signal that is impressed between said input terminals, a second resistor connected between the load current path of said second variable and controllable impedance device and the junction of said first variable and controllable impedance device and said first resistor to control the effective impedance of said first variable and controllable impedance device directly with the current flow through said second variable and controllable impedance device and thereby cause the impedance of said first variable and controllable impedance device to vary directly with the amplitude of the signal impressed across said input terminals.

2. A negative resistance network comprising a first signal amplifier device, including a first electrode, a second electrode, and a control electrode connected to a fixed potential for controlling the current flow between said first and second electrodes in accordance with the amplitude of the instantaneous signal between said control electrode and said first electrode, means connected to said second electrode for applying an input signal between said second electrode and a point of fixed reference potential, means coupled with said control electrode to render said first device in a conducting state, a first impedance element connected between said first electrode and said point of fixed reference potential, a second signal amplifier device, including a first electrode, a second electrode, and a control electrode for controlling the current flow between the first and second electrodes of said second device in accordance with the instantaneous signal between the control electrode and the first electrode of said second device, means connected directly between the control electrode of said second device and the second electrode of said first device for providing a direct current path between said electrodes to control the current flow through said second device in accordance with the amplitude of the instantaneous signal between the second electrode of said first device and said point of fixed reference potential, a second impedance element connected between the first electrode of said second device and the first electrode of said first device for controlling the amplitude of the instantaneous signal between the control electrode and the first electrode of said first device inversely with the instantaneous current flow through said second device to cause the current flow through said first device to vary inversely with said input signal.

3. A negative resistance network as defined in claim 2 wherein said impedance elements are resistive elements.

4. A negative resistance network as defined in claim 3 wherein each of said resistance elements is adjustable.

5. A negative resistance network comprising a first and a second input terminal between which the negative resistance is effective, said second terminal being connected to a point of fixed reference potential, a first semiconductor device including a first emitter, a first collector and a first base electrode in contact therewith, said collector being connected to said first terminal, a first impedance element connected between said first emitter and said point of fixed reference potential, means coupled with said first base to render said first semiconductor device in a conducting state, a second semiconductor device including a second emitter, a second collector and a second base electrode in contact therewith, circuit means connected between said second base and said first collector for providing a direct current path between said electrodes to control the current flow through said second device in accordance with the amplitude of the instantaneous signal between said first collector and said point of fixed reference potential, a second impedance element connected between said second emitter and said first emitter for controlling the amplitude of the instantaneous signal between said first base and said first emitter inversely with the instantaneous current flow through said second device.

6. A negative resistance network as defined in claim 5 wherein said semiconductor devices are junction transistors.

7. A negative resistance network as defined in claim 6 wherein each of said impedance elements is variable.

8. A negative resistance network as defined in claim 6 wherein said impedance elements are resistive elements.

9. A negative resistance network as defined in claim 6 wherein each of said impedance elements is a variable resistance element.

10. A negative resistance network comprising a first and a second input terminal between which the negative resistance is effective, said second terminal being connected to a point of fixed reference potential, a first electron discharge device including a first plate, a first cathode and a first grid for controlling the current flow between said plate and cathode in accordance with the amplitude of the instantaneous signal between said grid and said cathode, said plate being connected to said first input terminal, a first impedance element connected between said first cathode and said point of fixed reference potential, means coupled to said first grid to render said first device in a conducting state, a second electron discharge device including a second plate, a second cathode and a second grid for controlling the current flow between said second plate and said second cathode in accordance with the amplitude of the instantaneous signal between said second grid and said second cathode, circuit means connected between said second grid and said first plate for providing a direct current path between said second grid and said first plate to control the current flow through said second discharge device in accordance with the amplitude of the instantaneous signal between said first plate and said point of fixed reference potential, a second impedance element connected between said second cathode and said first cathode for controlling the amplitude of the instantaneous signal between said first grid and said first cathode inversely with the instantaneous current flow through said second discharge device to cause the current flow through said first discharge device to vary inversely with the signal impressed between said input terminals.

11. A negative resistance network as defined in claim 10 wherein each of said impedance elements is variable.

12. A negative resistance network as defined in claim 10 wherein said impedance elements are resistive elements.

13. A negative resistance network as defined in claim 10 wherein each of said impedance elements is a variable resistance element.

14. A negative resistance network including first and second input terminals between which the negative resistance is effective and with said second input terminal connected to a point of fixed referenced potential, said network comprising: a first controllable impedance device having two conduction terminals and a control terminal, said control terminal maintained at a fixed potential; a second impedance device for conducting a constant current; said conduction terminals of said first impedance device connected in series with said second impedance device between said first and said second input terminals, said first and second impedance device having a common junction point; a potential source; a third controllable impedance device having first and second conduction terminals and having a control terminal, with said control terminal connected directly to said first input terminal, with said first conduction terminal connected to said potential source, and said second conduction terminal connected to said common junction so as to control the current flow through said first and second conduction terminals directly with the amplitude of the signal that is impressed between said first and second input terminals; and a fourth impedance device connected between said second conduction terminal and said common junction, whereby the effective impedance across said conduction terminals of said first device is controlled directly with the current flow through said third device to thereby cause the impedance of said first device to vary directly with the amplitude of the signal impressed on said first and second input terminals.

References Cited in the file of this patent

UNITED STATES PATENTS

| | | |
|---|---|---|
| 2,329,073 | Mitchell | Sept. 7, 1943 |
| 2,728,053 | Bangert | Dec. 20, 1955 |
| 2,774,043 | Villard | Dec. 11, 1956 |
| 2,864,062 | Schaffner | Dec. 9, 1958 |

FOREIGN PATENTS

| | | |
|---|---|---|
| 472,326 | Great Britain | Sept. 22, 1937 |